United States Patent [19]

Orzikowski et al.

[11] Patent Number: 4,591,881
[45] Date of Patent: May 27, 1986

[54] ARM-DEFLECTING SYSTEM FOR RECORDING APPARATUS

[75] Inventors: Günter Orzikowski, Au; Rudolf Niethammer; Jochen Bahr, both of Freiburg im Breisgau, all of Fed. Rep. of Germany

[73] Assignee: Hellige GmbH, Freiburg im Breisgau, Fed. Rep. of Germany

[21] Appl. No.: 398,209

[22] Filed: Jul. 14, 1982

[30] Foreign Application Priority Data

Jul. 15, 1981 [DE] Fed. Rep. of Germany ....... 3127992

[51] Int. Cl.⁴ .............................................. G01D 15/16
[52] U.S. Cl. .............................. 346/117 R; 346/139 R
[58] Field of Search ......................... 346/139 R, 117 R

[56] References Cited

U.S. PATENT DOCUMENTS 3,317,915  5/1967  Thompson ...................... 346/139 R

OTHER PUBLICATIONS

Electronics in Engineering, 2nd Ed., 1961, W. Hill, McGraw-Hill, p. 293.

Primary Examiner—E. A. Goldberg
Assistant Examiner—Gerald E. Preston
Attorney, Agent, or Firm—Herbert A. Stern

[57] ABSTRACT

Disclosed herein is an arm deflecting drive system for strip chart recorders. The drive system mechanism includes a variable resistance structure which produces a position signal indicative of the angular position of the deflecting arm, which signal is proportional to the tangent of the position angle of the arm. The drive mechanism further includes a differential amplifier receiving both the position signal and a reference signal and generating a deflection signal related to the difference between the reference and position signals. In accordance with the invention, the variable resistance structure may include a track of electrically resistant material contoured to provide the tangential relationship between the position signal and the position angle or, alternatively, the track may be formed from an inhomogeneous material to provide such tangential relationship.

4 Claims, 4 Drawing Figures

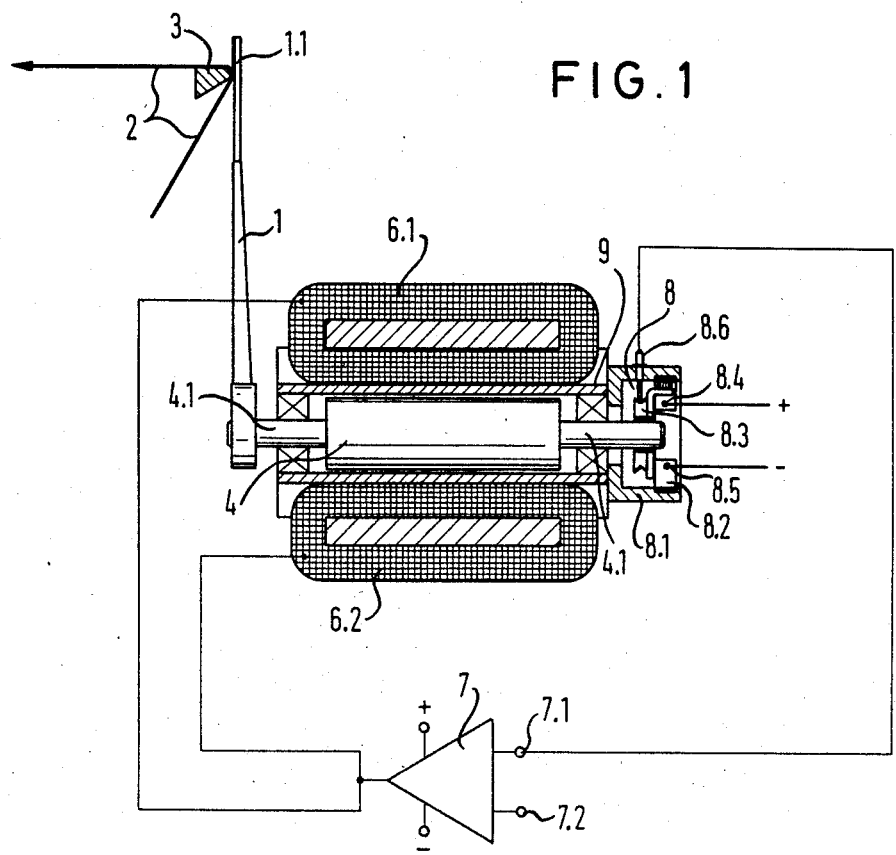

ARM-DEFLECTING SYSTEM FOR RECORDING APPARATUS

The present invention relates to recording apparatus such as that which is suitable for recording technical, scientific and particularly biological and medical data (e.g. electro-cardiographs and electro-encephalographs).

BACKGROUND OF THE INVENTION

In known recording apparatus, continuous recording of measurements is achieved by the marking of a record carrier by a recording arm deflected by the action of measuring impulses or signals.

The marking may be done by a pen mounted on the arm. Alternatively, a heating element may replace the pen and be used in combination with heat-responsive paper which undergoes a color change where adjacent to the element. A known third alternative involves the transference of a dry pigment tracing from a pigment or color carrier, such as a strip of carbon paper, to a strip-form record carrier under the pressure of the arm.

Such recording mechanisms are used in technical and scientific and particularly in biological and medical diagnostic recording apparatus such as electrocardiographs and electroencephalographs in order to record permanently and in directly visible form the changes of physical values, converted where desired into amplifiable current or voltage fluctuations, occuring in the subject under examination (the patient).

Such recording apparatus generally includes a means for converting electric signals comprising voltage or current fluctuations into a visible deflection of the recording arm. In operation of the above recording apparatus, the record carrier of, for example, paper, plastic or metal foil, is traversed through the recorder by means, usually in the form of rollers, for holding, guiding, tensioning and retarding the record carrier. A base, which is slightly yieldable or unyieldable is disposed in the recorder and is preferably in the form of an edge extending perpendicularly both to the direction of movement of the record carrier and also to the recording arm in its position of rest. The record carrier is passed between the base and the recording arm in directions which are inclined to one another, preferably at an obtuse or acute angle. The recording arm contacts the record carrier at the recording edge to produce a recorded trace.

The end of the recording arm remote from the record carrier is mounted for pivoting rotation so that the pivoting of the arm causes its marking end to travel across the face of the record carrier in a direction generally transverse to the direction of carrier movement.

This invention is more particularly related to the arm-deflecting drive system of such recorders, and is particularly suitable for rapid recording with single- and multi-channel lever arm strip churt recorders having a limited angle of rotation. The drive system typically includes a drive coil responsive to a deflection signal to deflect the arm by genrerating an electromagnetically induced pivoting force on the arm. The deflection signal is, in turn, generated by a differential amplifier responsive to the difference between two electrical signals. The first electrical signal is indicative of the angular position of the arm corresponding to the value to be recorded. The second electrical signal is indicative of the angular position of the arm and is produced by an angular position detector, subsequently described in greater detail.

The power amplifier amplifies the difference of the signals applied to its two input terminals, produces a correction signal corresponding to the difference between the desired nominal and actual values and applies this to the driver coil(s) of the drive system. The current flowing in the driver coil(s) effects a rotation of movement corresponding to the deviation of the angular position of the rotor from the nominal value. The suitable dimensioning of the power amplifier ensures the complete equilization of the control deviation.

Various types of angular position detectors for drive systems of recording elements have been used, employing a number of different principles: inductive angular position detectors operating according to the differential transormer principle, capacitive angular position detectors operating according to the differential capacitor principle, optical angular position detectors operating according to the principle of the differential pick-up with variable aperture openings for the light passing through the aperture.

All of the foregoing position detectors have required special measures for producing their functional readiness in that they have had to be supplied with suitably adapted exciter signals in accordance with their physical principles. Inductive and capacitive angular position detectors have required high frequency input voltages with possibly high voltage values. The required voltages necessitated costly electronic circuits, such as high frequency generators. In some cases, costly screening measures against magnetic and/or electric fields were necessary.

On the output side, inductive or capacitive angular position detectors additionally require electronic parts of the demodulation of the carrier-containing detector output signal. Demodulators, however, influence the phase angle of the demodulated signal in an undesirable manner. Since stable control of the closed control circuit, while keeping within the phase margin relationship, can be achieved only by reducing the upper cut-off frequency according to the changeover of the phase from a nonmodulated to a modulated angular position signal, demodulation results in a reduction in the upper cut-off frequency of the drive system.

Optical position detectors require light sources of high time stability and long duration. In addition, special measures are required against the ingress of extraneous light and/or undesirable reflections from the light source onto the light receiver.

All the foregoing angle position detectors have an additional common problem in that their use requires the addition of relatively massive elements to the pivoting arm, the polar moment of inertia of which mass, with respect to the polar moments of inertia of the remaining elements to be moved, is not insignificantly small. Because of the masses which have to be additionally driven, the total polar mass moment of inertia is increased in an undesirable manner, causing the upper cut-off frequency of the drive system to be ever further reduced. Since the movement of the additional mass requires additional torque, and the total available torque produced in the drive system is fixed, the ability of the arm to be quickly deflected is diminished.

It is therefore the aim of the invention to provide an angular position detector which eliminates the foregoing deficiencies respectively associated with commonly used angular position detectors.

SUMMARY OF THE INVENTION

Accordingly, an arm-deflecting drive system overcoming the foregoing deficiencies is described comprising an arm mounted for pivoting movement and having one end positioned to create a marking contact on a record carrier; variable resistance means for producing a first electrical signal substantially proportional to the tangent of the arm's angular position and mounted in slip-ring relation with the arm; differential amplifier means for producing a correction signal proportional to the difference between the first electrical signal and a second electrical signal; means for applying the second signal to the amplifier means; and deflection means responsive to the correction signal for pivoting the arm. As a result of the geometric relationships between the pivoting arm and the record carrier, the effective length of the recording arm changes during a deflection. The effective length of the recording arm is defined by the distance of the pivot axis (or its intended extension) from the contact point of the arm and carrier. The carrier, as explained earlier, is being transported under tension over the recording edge of the recording device, where contact by the arm is made. As a result of the described changes in the effective length of the recording arm, during the deflection of the recording arm, linearity errors would be generated if the first electrical signal were proportional to the angular position of the arm instead of the tangent of the angle. The linearity error total is greatest when the angular deflections of the rotor are at maximum, i.e. along the edges of the recording region of the recording carrier.

The invention is explained in more detail in the following description of a preferred embodiment, of which the following drawing is a part.

BRIEF DESCRIPTION OF THE DRAWING

In the drawing,

FIG. 1 is a cross-sectional view of the drive system constructed in accordance with the invention and a schematically illustrating associated power amplifier with differential input, FIG. 2 is a two-dimensional projection of one embodiment of the resistance layer of the angular position detector according to the invention, FIG. 3 is a graphical representation of the characteristic curve of the angular position detector according to the invention showing its electrical output signal as a function of angular arm deflection, and FIG. 4 is a schematic illustration of the pivoting arm's angle of rotation.

DESCRIPTION OF THE PREFERRED EMBODIMENT

In FIG. 1, reference 1 represents the recording arm of a strip recorder. Depending on the embodiment of the recorder, the recording element point 1.1 is heated or unheated depending on the type of recording carrier 2 being used. The record carrier 2 is transported at a selected speed, and under tension, over a recording edge 3 by means of a drive device, not shown.

The record carrier 2 resting on the recording edge 3 is contacted by the recording element point 1.1 and provided with a marking track, the shape of which corresponds to the shape of the measuring signal to be recorded. The other end of the recording arm 1 is mounted for pivoting rotational movement on a rotor hub 4.1 of a rotor 4.

FIG. 4 is a schematic illustration of the limited pivoting rotational movement made by the arm 1 and the rotor 4 to which the arm 1 is connected. Reference numeral 5.0 indicates the 0°, or center, position of the recording element 1, and the arm 1 is shown in contact with the record carrier 3 at the edge 3 as described above. Reference numeral 5.1 corresponds to the extreme deflection position of the recording arm 1 in one direction (the negative direction) and the rotor 4, while numeral 5.2 indicates the other extreme (the positive direction). The angular position of the arm 1 and rotor 4 may accordingly vary from $-a_1$ to $+a_1$ As evident from FIG. 4, the effective length of arm 1 increases as its angular position changes from 0° towards $+a_1$ or towards $-a_1$.

Rotary movement is imparted to the rotor 4 of the drive system shown in FIG. 1 as a result of the current flowing through the drive coils 6.1 and 6.2; the direction of rotation of the rotor 4 is dependent upon the polarity of the current, while the extent of the rotary movement is dependent upon the magnitude of the current.

The drive coils 6.1 and 6.2 are connected in parallel to the output of a differential power amplifier 7. A series connection of the two drive coils 6.1 and 6.2 is likewise possible, and drive systems for recording elements with a different number of drive coils, for example a single coil, may also be used.

The power amplifier 7 amplifies the difference of the input signals applied to the two input terminals 7.1 and 7.2. The input terminal 7.1 is connected to the electrical signal measured by an angular position detector 8 which is proportional to the tangent of the actual angular deflection of the rotor 4 from its 0° position. The input terminal 7.2 is connected with the electrical signal proportional to the measured value to be recorded and corresponding to the nominal angular deflection of the rotor 4.

The angular position detector 8 is a potentiometer having a housing 8.1 concentrically disposed in axial alignment with the axis of the rotor 4 and connected to the main body 9 of the drive system. A resistance track 8.2 is secured to the inner wall of the housing 8.1. The movable contact 8.3 of the potentiometer is fixed to the rotor 4 and insulated therefrom. The contact takes up the voltage value from the resistance track 8.2 of the potentiometer which is in accordance with the tangent of the angular deflection of the rotor 4. This may be accomplished in numerous ways. For example, the track may be contoured or, alternatively, the resistive material of the track may be inhomgeneously, rather than uniformly, applied.

The resistance track 8.2 is supplied at its ends 8.4 and 8.5 with a supply voltage from a voltage source (not shown). In a strip recorder according to the present invention, the supply voltage may be readily obtained from voltage sources which are available as necessary for the supply of other electronic components, such as amplifiers.

In FIG. 3 there is represented the shape of the characteristic curve of the angular position detector 8 according to the invention. On the abscissa axis there is recorded in linear scale the rotary angle of the rotor 4, on the ordinate axis there is shown the electrical signal U of the angular position detector 8 which is tapped at the terminal 8.6 by the movable contact 8.3.

The shape of the characteristic curve of the signal U through the rotary angle, at least within the angular region of $+a_1$ to $-a_1$ correspondends to the curve of the tangential function. As a result of the tangential characteristic curve of the angular position detector 8, there are produced linear recordings on the record carrier 2. If one were to use an angular position detector with linear transient response for reporting back the angular position of the rotor, it would result in nonlinear recordings appearing on the recording support 2 because of the geometric relationships in lever arm strip records with edge recordings.

We claim:

1. For use in a recording device of the type employing a pivotably deflectable arm adapted to mark a moving record carrier in accordance with the magnitude of a monitored signal, an arm-deflecting drive system comprising:
an arm mounted within said device for rotating movement through a limited range of rotation angles to produce a mark on the record carrier;
variable resistance means providing a single signal and mounted in slip-ring relationship with the arm and device to produce a position signal indicative of the angular position of the arm and proportional to the tangent of the position angle;
differential amplifier means for generating a deflection signal in response to the difference between the monitored and position signals; and
means responsive to the deflection signal for rotating the arm to an angular position whereby the mark on the record carrier graphically depicts the magnitude of the monitored signal.

2. The system of claim 1 wherein the variable resistance means includes a track of electrically resistant material adapted for coupling across a source of voltage, a contact movable with respect to the track, one of either the track and contact being coupled to the arm for rotation therewith, the other of either the track and contact being rotationally fixed relative to said arm and in electrical contact with said one substantially throughout the range of position angles.

3. The system of claim 2 wherein the track is contoured to provide the tangential relationship between the position signal and position angle.

4. The system of claim 2 where the track is formed from inhomogeneous material to provide the tangential relationship between the position signal and the position angle.

* * * * *